US008688431B2

(12) United States Patent
Lyons et al.

(10) Patent No.: US 8,688,431 B2
(45) Date of Patent: Apr. 1, 2014

(54) COMPUTER SYSTEM AUDIO DEVICE SWITCHING

(75) Inventors: Kenneth S. Lyons, Middleboro, MA (US); David A. Howley, Franklin, MA (US); Benjamin D. Burge, Shaker Heights, OH (US)

(73) Assignee: Bose Corporation, Framingham, MA (US)

( * ) Notice: Subject to any disclaimer, the term of this patent is extended or adjusted under 35 U.S.C. 154(b) by 226 days.

(21) Appl. No.: 13/079,898

(22) Filed: Apr. 5, 2011

(65) Prior Publication Data

US 2012/0259612 A1  Oct. 11, 2012

(51) Int. Cl.
G06F 9/44 (2006.01)
G06F 13/10 (2006.01)
G06F 13/12 (2006.01)

(52) U.S. Cl.
USPC .......................................................... 703/21

(58) Field of Classification Search
USPC .......................................................... 703/21
See application file for complete search history.

(56) References Cited

U.S. PATENT DOCUMENTS

| 7,881,919 | B2 * | 2/2011 | Trumble et al. | 703/21 |
| 8,006,023 | B1 * | 8/2011 | Pan et al. | 710/313 |
| 2007/0299650 | A1 * | 12/2007 | Tamayo et al. | 703/27 |
| 2008/0288708 | A1 * | 11/2008 | Hsueh | 710/313 |

* cited by examiner

*Primary Examiner* — Matt Kim
*Assistant Examiner* — Maryam Ipakchi

(57) ABSTRACT

A detachable audio device structured to be coupled to an interface port of a computer system simulates the coupling and uncoupling of an audio controller to trigger an operating system being executed by a processing device of the computer system to select between an audio driver for that same audio controller and another audio driver for a different audio controller to which the processing device of the computer system has access, thus triggering a selection between causing audio played by the computer system to be acoustically output through either an acoustic driver to which the detachable audio device relays the audio or another acoustic driver associated with the other audio controller to which the processing device of the computer system has access.

19 Claims, 5 Drawing Sheets

COMPUTER SYSTEM AUDIO DEVICE SWITCHING

TECHNICAL FIELD

This disclosure relates to switching between audio devices of a computer system for at least outputting audio.

BACKGROUND

Computer systems have rapidly supplanted more traditional audio/visual devices (e.g., tape decks, CD and DVD players, record players, VCRs, etc.) as the audio/visual device of choice for storing, organizing and playing audio/visual programs (e.g., pieces of music, recorded lectures, recordings of live performances, movies, slideshows, family pictures, episodes of a television program, etc.). It has become commonplace to use a computer system (whether a full-size desktop computer, a laptop computer, a handheld computer, etc.) to access a server through a connection to the Internet to retrieve copies of audio/visual programs from Internet websites, and either store them on a storage device of the computer (e.g., a hard drive, an optical disk media, a solid-state storage media, etc.) for later playing or to play them as they are streamed from those servers to the computer. It has also more become commonplace to use a computer system as the audio/visual device from which stored or streamed audio/visual programs are played, instead of playing those audio/visual programs from those more traditional audio/visual devices.

However, the tendency for computer systems to be designed as general purpose devices often results in manufacturers making choices in design trade-offs that create computer systems with screens and/or speakers that are less than optimal in providing high quality visual and audio output. Further, although many computer systems incorporate a built-in capability to directly drive speakers through an internal audio device to acoustically output audio, computer systems tend to be very electrically noisy such that buzzing sounds and other audio artifacts caused by ground loops and other electrical issues tend to be transmitted to such speakers, along with the desired audio. On occasions where a user of a computer system simply desires to listen to the acoustic output of audio while performing some manner of task on a computer system or at least in the vicinity of a computer system, the lesser quality output of a computer system's built in audio capabilities may be deemed by the user to be sufficient, since they are essentially employing that audio as "background" audio. However, at other times where the user of a computer system wishes to have a high quality experience in acoustically outputting audio, there is still a desire to employ at least some forms of more traditional audio/visual devices in which the greater focus in the design of those devices on the function of acoustically outputting audio brings about a higher quality result that the user deems to be more enjoyable.

However, most computer systems of the type likely to be used at the desk of a person at home or in an office employ operating system software (e.g., the Windows series of operating systems purveyed by Microsoft Corporation of Redmond, Wash.) that, like the computer systems themselves, are designed to serve a wide variety of functions and are not designed with a focus on enabling the playing of audio/visual programs with at least high quality acoustic output of audio. Thus, such operating system software tends to be designed with a presumption that a user of a computer system will tend to employ only one form of audio device that is either built into that computer system or that otherwise remains relatively permanently coupled to that computer system in acoustically outputting any audio. And thus, such operating system software tends to be designed with only minimal support for the possibility that a user of a computer system may have more than one audio device incorporated into or otherwise coupled to their computer system to acoustically output audio where they may switch between those audio devices from time to time.

SUMMARY

A detachable audio device structured to be coupled to an interface port of a computer system simulates the coupling and uncoupling of an audio controller to trigger an operating system being executed by a processing device of the computer system to select between an audio driver for that same audio controller and another audio driver for a different audio controller to which the processing device of the computer system has access, thus triggering a selection between causing audio played by the computer system to be acoustically output through either an acoustic driver to which the detachable audio device relays the audio or another acoustic driver associated with the other audio controller to which the processing device of the computer system has access.

In one aspect, a detachable audio device includes a first connector to be coupled to a second connector of a computer system, an interface controller coupled to the first connector, a first processing device, and a first storage storing a sequence of instructions. When the sequence of instructions is executed by the first processing device, the first processing device is caused to operate the interface controller to simulate coupling of a first audio controller to the computer system through the first and second connectors at a time when the first and second connectors are coupled to trigger a first performance of a device discovery procedure through the second connector by a second processing device of the computer system; and operate the interface controller to respond to the first performance of the device discovery procedure through the second connector by the second processing device by providing the computer system a first device identity data through the first and second connectors, wherein the first device identity data presents the detachable audio device as comprising the first audio controller to enable acoustic output of audio by the computer system through the detachable audio device to trigger an operating system executed by the second processing device to employ a first audio driver in acoustically outputting audio to cause the computer system to employ the detachable audio device in acoustically outputting audio.

In one aspect, a method includes simulating coupling of a first audio controller to a computer system through a first connector of a detachable audio device and a second connector of the computer system at a time when the first and second connectors are coupled to trigger a first performance of a device discovery procedure through the second connector by a processing device of the computer system; and responding to the first performance of the device discovery procedure through the second connector by providing the computer system a first device identity data through the first and second connectors, wherein the first device identity data presents the detachable audio device as comprising the first audio controller to enable acoustic output of audio by the computer system through the detachable audio device to trigger an operating system executed by the processing device to employ a first audio driver in acoustically outputting audio to cause the computer system to employ the detachable audio device in acoustically outputting audio.

Other features and advantages of the invention will be apparent from the description and claims that follow.

DETAILED DESCRIPTION

It is intended that what is disclosed and what is claimed herein is applicable to a wide variety of computer systems structured via choice of processing device and/or software to be capable of being general purpose computing devices. It should be noted that although various specific embodiments of computer systems (e.g., desktop computers, laptop computers, so-called "luggable" computers, so-called "all-in-one" computers, handheld computers, and so-called "tablet" computers) are presented with some degree of detail, such presentations of specific embodiments are intended to facilitate understanding through use of examples, and should not be taken as limiting either the scope of disclosure or claim coverage. It is intended that what is disclosed and what is claimed herein is applicable to computer systems structured (through hardware structure and/or executable sequences of instructions) to serve as audio/visual devices and to cooperate with other devices to play an audio/visual program and/or to cause an audio/visual program to be played.

It is intended that what is disclosed and what is claimed herein is applicable to the acoustic outputting of an audio portion of any of a variety of types of audio/visual programs. Such audio/visual programs may be made up solely of audio such that the audio portion is essentially the entirety of those audio/visual programs. Alternatively, such audio/visual programs may incorporate motion video, still images, human-readable text, etc., along with an audio portion. Thus, although the term "audio/visual program" includes the word "visual," this should be taken as a broad term denoting either audio/visual programs that include something in addition to audio meant to be played to a user, or audio/visual programs that are made up entirely of audio meant to be played to a user. Further, although what is described and claimed herein focuses largely on the acoustic outputting of audio, this should not be taken as an indication that what is played to a user is solely audio. In other words, motion video, still images, human-readable text or still other forms of information or stimuli may be played to a user as part of the playing of audio.

Figure 1A:
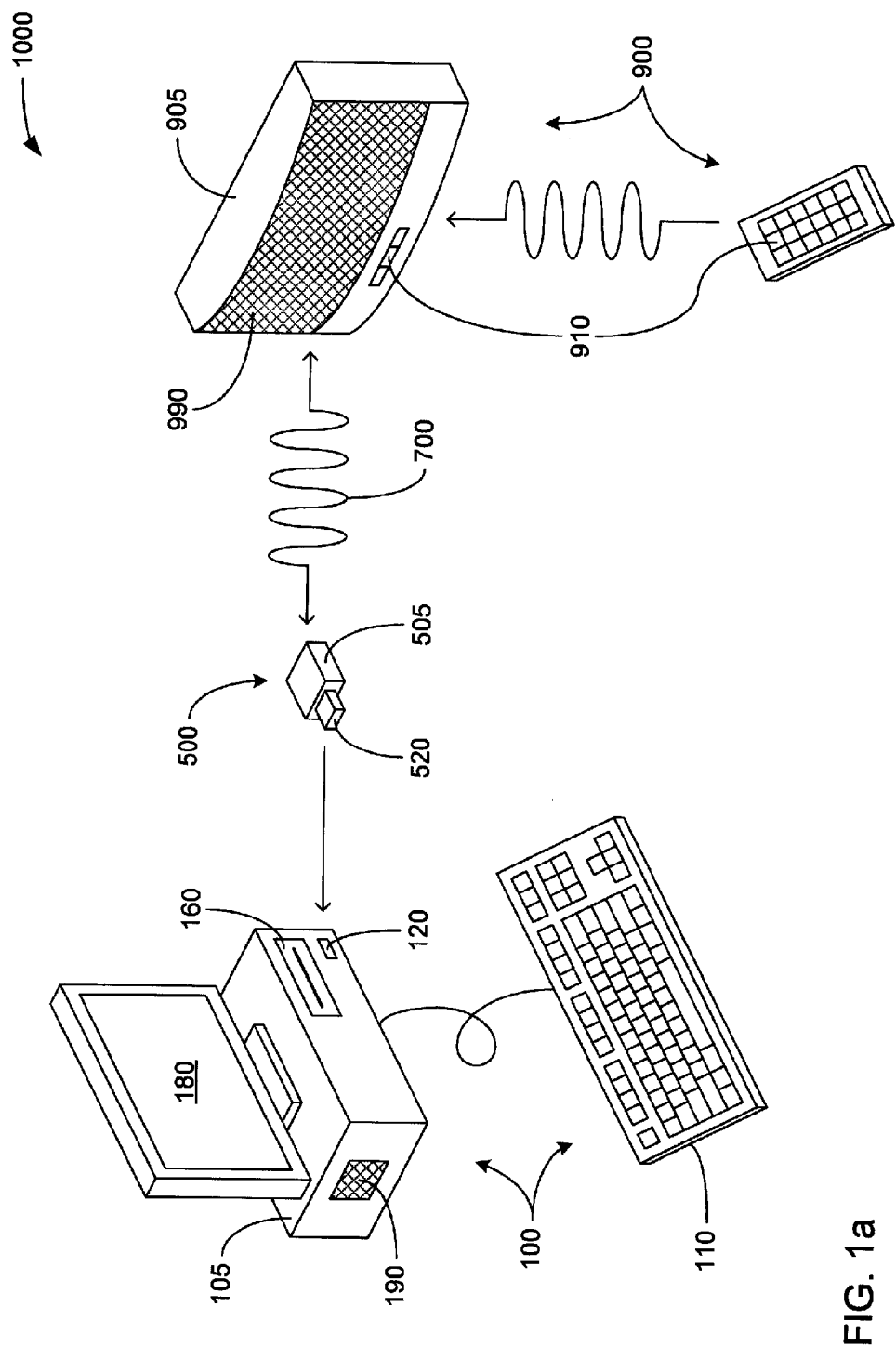
FIGS. 1a and 1b are perspective views of two variants of an audio system.
Figure 1B:
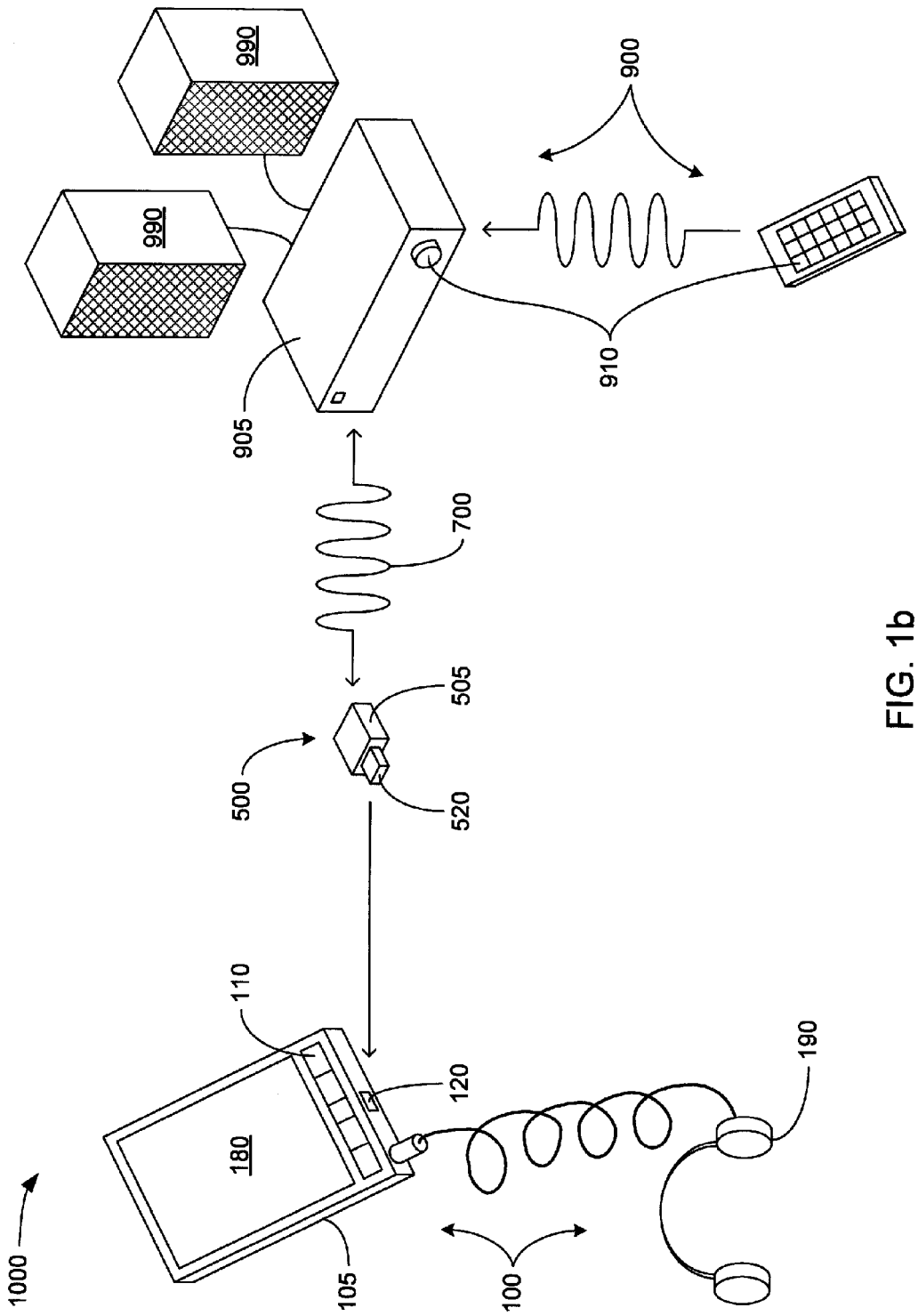

FIGS. 1a and 1b depict two possible variants of an audio system 1000 that enables a user to listen to audio being acoustically output through either one of two devices. In both variants, the audio system 1000 incorporates at least a computer system 100, a detachable audio device 500 and an audio/visual device 900. As will be explained in greater detail, a user of the audio system 1000 operates a manually-operable control of the audio/visual device 900 to signal the detachable audio device 500 to cooperate with the computer system 100 to enable an audio portion of an audio/visual program stored on the computer system 100 to be acoustically output either through an audio device of the computer system 100 or an audio device of the audio/visual device 900.

The computer system 100 incorporates at least a casing 105, an interface port 120 enabling the coupling of various devices to the computer system 100 (including the detachable audio device 500), and one or more acoustic drivers 190 (depicted in FIG. 1a as carried within the casing 105, and depicted in FIG. 1b as a pair of in-ear earphones coupled to other portions of the computer system 100 via a cable) by which audio may be directly acoustically output by the computer system 100. The computer system 100 may further incorporate a removable media device 160 by which data (e.g., audio/visual programs) and/or software may be exchanged between the computer system 100 and other devices, although the computer system 100 may also engage in such exchanges via a network connection in addition to or in lieu of incorporating and using the removable media device 160. Also, the computer system 100 may further incorporate a display 180 by which visual portions of audio/visual programs and/or other information may be visually displayed.

It should be noted that although the computer system 100 is depicted in FIG. 1a as having a box-like physical configuration typical of a "desktop" computer system, and although the computer system 100 is depicted in FIG. 1b as a handheld computer system (e.g., a "personal data assistant" or "smart phone"), the computer system 100 may have any of a variety of other possible physical configurations, including and not limited to, a "laptop" computer system, a rackmount computer system or a "tablet" computer system. In each of these and other possible physical configurations, the computer system 100 may or may not have one or both of a user input device 110 (e.g., a mouse, touchpad, touchscreen, trackball, stylus, joystick, one or more buttons or switches, or keyboard), or a display 180.

The detachable audio device 500 incorporates at least a casing 505, an interface port 520 made up of at least a connector configured to be coupled to a mating connector of the interface port 120 of the computer system 100, and a wireless transceiver (not shown in FIG. 1a or 1b). As depicted, the casing 505 of the detachable audio device 500 is smaller size in comparison to the casing 105 of the computer system 100, and is meant to be directly coupled to the computer system 100 via the mating connectors of the interface ports 120 and 520 such that the detachable audio device 500 is physically supported by the computer system 100 in a cantilever configuration when so coupled. As those skilled in the art of computer systems will readily recognize, a device having such a physical configuration is commonly referred to as a "dongle." As an alternative to such a cantilever arrangement, the interface port 120 may incorporate an opening formed in a face of the casing 105 that is shaped and sized so as to accommodate at least a portion of the casing 505 being inserted therein as part of coupling together connectors of the interface ports 120 and 520, thereby enabling the detachable audio device 500 to be physically supported as by being at least partially carried within the computer system 100.

The mating connectors of the interface ports 120 and 520 incorporate electrical and/or optical contacts that are configured to cooperate when the interface ports 120 and 520 are coupled to convey the electrical and/or optical signals of an interface bus between them. Thus, when the interface ports 120 and 520 are coupled, electrical and/or optical signals of an interface bus are conveyed between the computer system 100 and the detachable audio device 500. This interface bus may employ signaling levels, signaling frequencies, voltages and/or current levels, protocols and/or other characteristics that may conform to the specifications of any of a wide variety of possible forms of interface bus known or used in the computer industry or other industry. In one embodiment, the connectors making up the interface ports 120 and 520, their contacts, and the interface bus that those contacts support are configured to conform to the specifications of Universal Serial Bus (USB) promulgated by the USB Implementers Forum, Inc. of Portland, Oreg., USA. As will be familiar to those skilled in the art of computer systems, USB is a bi-directional digital serial bus, made up of a clock signal and a data signal, and electrically supporting "hot-plugging" in which devices may be coupled or uncoupled via USB without being turned off. Alternatively, the connectors making up the interface ports 120 and 520, their contacts, and the interface bus that those contacts support are configured to conform to the specifications of Musical Instrument Digital Interface (MIDI) promulgated by the MIDI Manufacturers Association of La Habra, Calif., USA. Other possible alternatives include the PCCard and ExpressCard specifications promulgated by the Personal Computer Memory Card International Association (PCMCIA) of San Jose, Calif., USA. Whatever interface bus the connectors of the interface ports 120 and 520 are configured to employ, it is preferred that hot-plugging be supported.

The audio/visual device 900 incorporates at least a casing 905, and a wireless transceiver (not shown in FIGS. 1*a* or 1*b*) to cooperate with the transceiver of the detachable audio device 500 to form a wireless link 700 between the detachable audio device 500 and the audio/visual device 900. The audio/visual device 900 also incorporates one or more acoustic drivers 990 (depicted in FIG. 1*a* as carried within the casing 905, and depicted in FIG. 1*b* as a pair of speakers coupled to other portions of the audio/visual device 900 via cables) by which audio may be directly acoustically output by the audio/visual device 900. The audio/visual device 900 may further incorporate a user input device 910 (carried directly by the casing 905 and/or separately carried by a wireless remote control), such as a power switch, cursor controls, a volume knob, etc. Also, the audio/visual device 900 may further incorporate a display (not shown) by which current operating state information regarding the audio/visual device 900 may be visually displayed.

As depicted in both FIGS. 1*a* and 1*b*, the audio/visual device 900 is a more traditional audio/visual device insofar as, unlike the computer system 100, the design of the audio/visual device 900 is more focused on at least the playing of audio/visual programs. Thus, the design of the audio/visual device 900 places greater emphasis on tightly controlling electrical noise and other factors that may affect the quality of acoustically output audio. More specifically, FIG. 1*a* depicts the audio/visual device 900 as having an "all-in-one" configuration common to wireless speakers or a "boom-box," and FIG. 1*b* depicts the audio/visual device 900 as having a more divided and box-like configuration common to many "stereo systems" having a distinct audio amplifier and/or "receiver" that drives the acoustic drivers 990 (separately housed in their own box-like casings) to acoustically output audio. However, it should be noted that the audio/visual device 900 may be any of a number of possible audio/visual devices, having any of a number of possible physical configurations, and capable of operating acoustic drivers (either built-in or separately encased), including and not limited to, a portable radio, a self-amplified speaker system possibly incorporating a docking port for handheld electronic devices, a television, etc.

The wireless link 700 formed between the detachable audio device 500 and the audio/visual device 900 enables commands to control the playing of at least an audio portion of an audio/visual program, as well as at least that audio portion of that audio/visual program, to be conveyed between them. The wireless link 700 may be implemented with signaling characteristics, amplitudes, frequencies and/or protocols chosen to conform to one or more industry standards, including and not limited to, IEEE 802.11a, 802.11b or 802.11g promulgated by the Institute of Electrical and Electronics Engineers (IEEE) of Washington, D.C.; Bluetooth promulgated by the Bluetooth Special Interest Group of Bellevue, Wash.; or ZigBee promulgated by the ZigBee Alliance of San Ramon, Calif.

With the detachable audio device 500 coupled to the computer system 100 (via the connectors of their interface ports 520 and 120, respectively), and with the audio/visual device 900 wirelessly coupled to the detachable audio device 500 (via the wireless link 700), a user of the audio system 1000 is able to operate the user input device 910 to selectively cause at least an audio portion of an audio/visual program stored on the computer system 100 (or otherwise accessible to the computer system 100) to be acoustically output by the computer system 100 through the acoustic drivers 990 of the audio/visual device 900, or to be acoustically output by the computer system 100 through the acoustic driver(s) 190 of the computer system 100, itself. As will be explained in greater detail, this entails causing an operating system software executed by a processing device of the computer system 100 to select between two different pieces of device driver software, one of which corresponds to an audio controller function of the detachable audio device 500, and the other of which corresponds to an internal audio controller of the computer system 100, itself.

Figure 2:
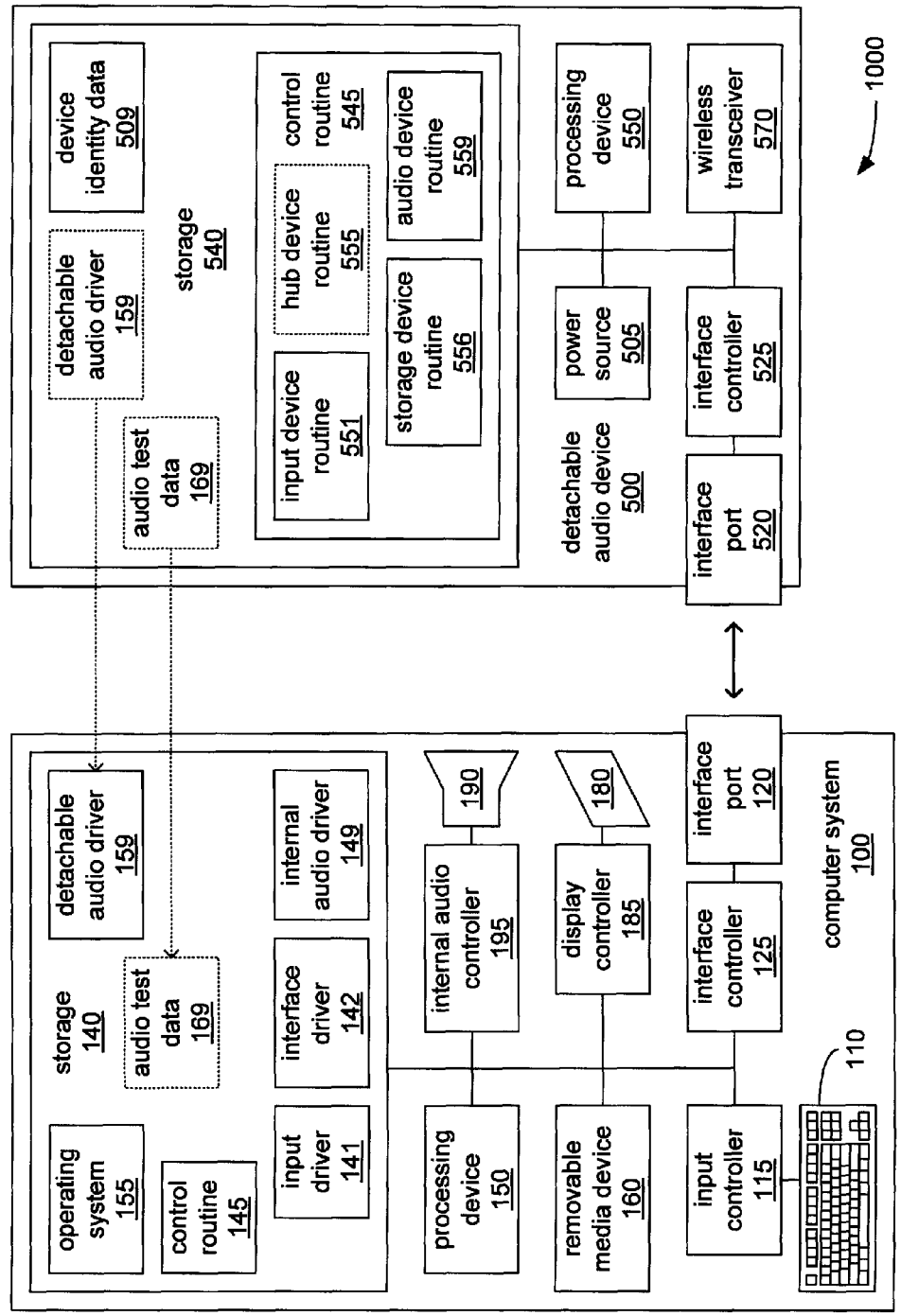
FIG. 2 is a block diagram of possible architectures of a computer system and a detachable audio device of either of the variants of audio system of FIGS. 1a and 1b.

FIG. 2 is a block diagram of possible architectures of the computer system 100 and of the detachable audio device 500, as well as of the larger audio system 1000. As will be explained in greater detail, aspects of these possible architectures for each of the computer system 100 and the detachable audio device 500 enable processing devices of each of these to execute stored sequences of instructions that cause an interaction between the computer system 100 and the detachable audio device 500 to take place to allow the selective use of one or the other of the acoustic drivers 190 or 990 in playing at least an audio portion of an audio/visual program.

Where the computer system 100 employs the depicted architecture, the computer system 100 further incorporates at least a processing device 150, an interface controller 125 accessible to the processing device 150 and coupled to the interface port 120, an internal audio controller 195 accessible to the processing device 150 and coupled to the acoustic driver(s) 190, and a storage 140 accessible to the processing device 150 and storing at least one sequence of instructions for access and execution by the processing device 150. The computer system 100 may further incorporate the removable media device 160 in a manner accessible to the processing device 150 to enable the provision of audio/visual programs for playing and/or other sequences of instructions for execution by the processing device 150 stored on removable media (not shown). Alternatively and/or additionally, the computer system 100 may further incorporate a network controller (not shown) in a manner accessible to the processing device 150 to enable the provision of audio/visual programs for playing and/or other sequences of instructions for execution by the processing device 150 through a local area network (LAN) and/or the Internet. Further, where the computer system 100 incorporates the user input device 110, the computer system 100 also incorporates an input controller 115 in a manner accessible to the processing device 150 to enable monitoring and receipt of manual input of a user by the processing device 150. Still further, where the computer system 100 incorporates the display 180, the computer system 100 also incorporates a display controller 185 in a manner accessible to the processing device 150 to enable the playing of at least a visual portion of an audio/visual program and/or to enable the visual display of information that may or may not be related to the playing of an audio/visual program.

Where the detachable audio device 500 employs the depicted architecture, the detachable audio device 500 further incorporates at least a processing device 550, an interface controller 525 accessible to the processing device and coupled to the interface port 520, a wireless transceiver 570 accessible to the processing device 550, and a storage 540 accessible to the processing device 550 and storing at least one sequence of instructions for execution by the processing device 550. The detachable audio device 500 may also incorporate a power source 505 able to provide power to one or more of the interface controller 525, the storage 540, the processing device 550 and the wireless transceiver 570 independently of whatever electric power the detachable audio device 500 may receive from the computer system 100 via the interface port 520. Further, where the power source 505 is a battery, a capacitor or other device capable of storing an electric charge, whatever electric power is received via the interface port 520 may be employed to recharge the power source 505.

Each of the processing devices 150 and 550 may be any of a variety of types of processing device based on any of a variety of technologies, including and not limited to, a general purpose central processing unit (CPU), a digital signal processor (DSP) or other similarly specialized processor having a limited instruction set optimized for a given range of functions, a reduced instruction set computer (RISC) processor, a microcontroller, a sequencer or combinational logic.

Each of the storages 140 and 540, as well as the removable media device 160, may be based on any of a wide variety of information storage technologies, including and not limited to, static RAM (random access memory), dynamic RAM, ROM (read-only memory) of either erasable or non-erasable form, FLASH, magnetic memory, ferromagnetic media storage, phase-change media storage, magneto-optical media storage or optical media storage. It should be noted that the storages 140 and 540 may incorporate both volatile and non-volatile portions, and although they are depicted in a manner that is suggestive of each being a single storage device, one or both of the storages 140 and 540 may be made up of multiple storage devices, each of which may be based on different technologies. This also applies to the removable media device 160. It is preferred that each of the storages 140 and 540 are at least partially based on some form of solid-state storage technology, and that at least a portion of that solid-state technology be of a non-volatile nature to prevent loss of data and/or routines stored within.

The interface controllers 125 and 525, being coupled to interface ports 120 and 520, respectively, cooperate with whatever form of connector is incorporated into the interface ports 120 and 520 to support the electrical and/or optical signaling needed to implement whatever form of interface bus specification is employed in communications between the computer system 100 and the detachable audio device 500. Correspondingly, the wireless transceiver 570 and a corresponding wireless transceiver (not shown) of the audio/visual device 900 cooperate to support the radio frequency (RF), infrared (IR), ultrasonic and/or whatever other form of signaling needed to implement whatever form of wireless communications is employed in communications between the detachable audio device 500 and the audio/visual device 900.

As depicted, stored within the storage 140 are various pieces of software (i.e., routines made up of sequences of instructions executable by the processing device 150) and/or pieces of data (e.g., data representing at least an audio portion of an audio/visual program). These include at least an operating system 155 to be executed by the processing device 150 to cause the processing device 150 to perform a variety of functions deemed "basic" to the normal operation of the computer system 100, and a control routine 145 to be executed along with the operating system 155 to at least play at least an audio portion of an audio/visual program (e.g., a software application for playing at least an audio portion of an audio/visual program). Various pieces of device driver software are also stored within the storage 140, including an input driver 141 to be executed along with the operating system 155 to enable operation of the input controller 115 by the processing device 150 to monitor and receive user input, an internal audio driver 149 to be executed along with the operating system 155 to enable operation of the internal audio controller 195 by the processing device 150 to play at least that audio portion of that audio/visual program via the acoustic driver(s) 190, and an interface driver 142 to be executed along with the operating system 155 to enable operation of the interface controller 125 by the processing device 150 to communicate with another device coupled to the interface port 120 (e.g., the detachable audio device 500). As will be explained in greater detail, a detachable audio driver 159 may also be stored within the storage 140 (perhaps intermittently, as will be explained) to be executed along with the operating system 155 to enable operation of the detachable audio device 500 by the processing device 150 (through the interface port 120) to play at least that audio portion of that audio/visual program via the acoustic driver(s) 990 as an alternative to operating the internal audio controller 195 to cause playing via the acoustic driver(s) 190. Still further, and as will also be explained in greater detail, an audio test data 169 may also be stored within the storage 140 (perhaps intermittently, as will be explained).

>>>>> As those skilled in the art of software development will readily recognize, this depicted combination of pieces of software that has just been described represents a typical division of software executed by a processing device of a computer system into an operating system, one or more pieces of application software, and one or more device drivers. Such a division has become common practice among software developers to enable separate development of a core operating system that is usually associated with a computer system architecture, applications software that may or may not be desired to be used with a computer system architecture to perform tasks chosen by that user (e.g., word processing, drawing, manipulating pictures, "surfing" the Internet, etc.), and device drivers that are usually associated with specific components of a computer system that may be selected by a user (e.g., a particular make and model of a laser printer, a scanner, a camera, etc.). It is common practice for a user to obtain a computer system that is accompanied by an operating system configured to work with that computer system (frequently provided together by a single vendor), then separately obtain pieces of applications software that the user desires to enable the user to employ that computer system in performing one or more tasks (the tasks often being the motivation for obtaining the computer system in the first place), and then separately obtain additional pieces of computer hardware to add to the computer system that enable the user to use the computer system in performing those tasks in a particular manner that the user desires. It is commonly the case that the user interacts most frequently with the applications software to perform their desired tasks (e.g., writing a letter, reading a piece of email, etc.) with the operating system essentially serving the supporting role of enabling a range of basic functionality that the application software requires (e.g., managing processing and storage resources, etc.). In turn, it is commonly the case that device driver software serves the supporting role of enabling the operating system to be used in conjunction whatever additional pieces of computer hardware that the user has obtained (essentially augmenting the operating system with the addition of support for those additional pieces of hardware).

As depicted, stored within the storage 540 are various pieces of software and/or pieces of data. These include at least a control routine 545 to be executed by the processing device 550 to cause the processing device 550 to operate the interface controller 525 to communicate with the computer system 100 (via the interface ports 120 and 520) to ultimately cooperate with the computer system 100 to play at least an audio portion of an audio/visual program via the acoustic driver(s) 990. A device identity data 509 made up of data (e.g., a code number or other form of data) that identifies the detachable audio device 500 to other devices that may be coupled to the interface port 520 may also be stored within the storage 540. Still further, an audio test data 169 may also be stored within the storage 140 (perhaps intermittently, as will be explained). As will be explained in greater detail, the detachable audio driver 159 and/or the audio test data 169 may also be stored within the storage 540 to enable the provision of the detachable audio driver 159 to the computer system 100 by the detachable audio device 500 for storage within the storage 140.

As those skilled in the art will readily recognize, the software employed in the operation of the detachable audio device 500 is not divided to as much of an extent as the software employed in the operation of the computer system 100. This is reflective of the differences in the range of functions meant to be served by the computer system 100 versus the detachable audio device 500. Unlike the computer system 100, which is meant to be usable for a wide variety of functions that may be desired to be performed by a user, the detachable audio device 500 is a much more specialized device with a far more limited range of intended functions that it is meant to serve. Thus, it is unlikely that the detachable audio device 500 will have been designed to be used with a wide variety of different possible pieces of applications software or with a wide variety of additional pieces of hardware requiring any of a variety of pieces of device driver software.

Where a user chooses to operate the computer system 100 to play at least an audio portion of an audio/visual program through the acoustic driver(s) 190, the processing device 150 accesses the storage 140 to retrieve and execute a sequence of instructions of the operating system 155 to await the user's input concerning such playing of that audio portion. In doing this, the processing device 150 also accesses the storage 140 to retrieve and execute a sequence of instructions of the input driver 141 to enable the processing device 150 to operate the input controller 115 to monitor for and receive the user's input provided to the computer system 100 by the user via the input device 110. Guided by the user's input, the processing device 150 accesses the storage 140 to retrieve and execute a sequence of instructions of the control routine 145, causing the processing device 150 obtain and then play that audio portion. In other words, the control routine 145 is the audio/visual playing application software that provides a user interface that the user interacts with to cause the playing of that audio portion. As part of being caused by the control routine 145 to play that audio portion, the processing device is caused to access the storage 140 to retrieve and execute a sequence of instructions of the internal audio driver 149 to enable the processing device 150 to operate the internal audio controller 195 to actually cause that audio portion to be played as by causing its acoustic output by the acoustic driver(s) 190 as driven by an audio amplifier of the internal audio controller 195.

Alternatively, where a user chooses to operate the computer system 100 and the detachable audio device 500 together to play at least that same audio portion of that same audio/visual program through the acoustic driver(s) 990 of the audio/visual device 900 (instead of through the acoustic driver(s) 190 of the computer system 100, itself), the processing device 150 again accesses the storage 140 to retrieve and execute a sequence of instructions of the operating system 155 to await the user's input concerning such playing of that audio portion. As before, the processing device 150 also accesses the storage 140 to retrieve and execute a sequence of instructions of the input driver 141 to enable the processing device 150 to operate the input controller 115 to monitor for and receive the user's input provided to the computer system 100 by the user via the input device 110. Again as before, guided by the user's input, the processing device 150 accesses the storage 140 to retrieve and execute a sequence of instructions of the control routine 145, causing the processing device 150 obtain and then play that audio portion. However, as part of being caused by the control routine 145 to play that audio portion, the processing device is caused to access the storage 140 to retrieve and execute a sequence of instructions of both the interface driver 142 to enable the processing device 150 to operate the interface controller 125 to communicate with the detachable audio device 500 through the interface port 120 and the detachable audio driver 159 to enable the processing device to operate the detachable audio driver 159 through the interface port 120 to actually cause that audio portion to be played as by causing its acoustic output by the acoustic driver (s) 990 as driven by an audio amplifier of the audio/visual device 900.

For the computer system 100 and the detachable audio device 500 to cooperate to play that same audio portion of that same audio/visual program through the acoustic driver(s) 990, the computer system 100 and the detachable audio device 500 must be coupled via the interface ports 120 and 520, respectively. As will be familiar to those skilled in the art, some varieties of interface bus support a device discovery procedure by which at least one of two devices coupled to each other via such an interface bus is able to identify the other. Such device discovery procedures are often deemed to be advantageous for use with devices capable of being coupled to any of a variety of other possible devices as a means to free a user of those devices of having to manually configure one or more aspects of one device to enable it to correctly interact with another. By way of example, in the cases of USB, PCCard or ExpressCard, it has become commonplace for operating system software of one device to automatically employ a device discovery procedure to identify another device that has just been coupled, and to use the discovered identity to select a device driver from a set of device drivers that is the best fit for enabling interaction between the two devices. Thus, and more specifically, upon the coupling of the interface ports 120 and 520, execution of a sequence of instructions of the interface driver 142 cause the processing device 150 to operate the interface controller 125 to perform a device discovery procedure, obtain the identity of the detachable audio device 500, and then select the appropriate piece of device driver software to enable use of the detachable audio device 500 with the computer system 100, namely the detachable audio driver 159. With the coupling of the interface ports 120 and 520, and with the performance of a device discovery procedure by the processing device 150 underway, the processing device 550 is caused (as a result of retrieving and executing a sequence of instructions of the control routine 545) to respond to this device discovery procedure by providing the device identity data 509, that is stored in the storage 540 and that identifies the detachable audio device 500, to the computer system 100 via the coupled interface ports 120 and 520.

As will be familiar to those skilled in the art of interface buses supporting device discovery procedures, some devices employing such interface buses for being coupled to other devices may also support the provision of an appropriate piece of device driver software to another device via that interface bus. Thus, and more specifically, the processing device 150 may also be caused by the interface driver 142 to operate the interface controller 125 to retrieve the detachable audio driver 159 from the detachable audio device 500. In other words, a copy of the detachable audio driver 159 may be conveyed from the storage 540 through the interface ports 120 and 520, and to the storage 140 (as indicated with dotted lines in FIG. 2). Depending on what operating system is selected as the operating system 155, it may be that this copy of the detachable audio driver 159 is stored in the storage 140 only as long as the detachable audio device 500 appears to remain coupled to the computer system 100, or it may be that the detachable audio driver 159 need be retrieved from the storage 540 (or whatever other source) only once and will remain stored within the storage 140. Alternatively, instead of the detachable audio driver 159 being stored in the storage 540 and provided to the computer system 100 by the detachable audio device 500, itself, the detachable audio driver 159 may be provided to the computer system 100 to be stored within the storage 140 via a piece of removable media accessed by the processing device 150 through reading of the contents of the removable media via the removable media device 160.

With the interface ports 120 and 520 coupled and the with the detachable audio driver 159 having been selected for execution by the processing device 150, further retrieval and execution of a sequence of instructions of the control routine 545 causes the processing device 550 to cooperate in the playing of the audio portion by operating the interface controller 525 to receive the audio portion from the computer system 100 (as the processing device 150 is caused to provide it to the detachable audio device 500), and by operating the wireless transceiver 570 to wirelessly relay the audio portion received from the computer system 100 to the audio/visual device 900. In so doing, the processing device 550 may modify one or more characteristics of the data format employed in the conveying of the audio portion from the computer system 100 to the detachable device 500 (e.g., bit width, sampling rate, magnitude encoding, compression ratio, etc.) to conform to a different data format employed in the wireless conveying of the same audio portion from the detachable audio device 500 to the audio/visual device 900 for being acoustically output via the acoustic driver(s) 990.

Unfortunately, although it may well be possible to employ the same computer system 100, the same operating system 155 and the same control routine 145 in playing at least an audio portion of an audio/visual program via either of the acoustic drivers 190 or 990, common practices in the design of typical operating systems (including the operating system 155) often make the process required for a user to choose one or the other of the acoustic drivers 190 and 990 undesirably cumbersome. More specifically, it has become a commonplace assumption in the creation of operating systems that a user is unlikely to change what acoustic driver(s) are employed in playing audio in such a manner as to require a change in audio controllers, along with an accompanying change in device driver software supporting audio controllers. In other words, there is a pervasive presumption that, at most, a user may change which acoustic driver(s) are used with a specific audio controller (e.g., changing between speakers built into a computer system casing and speakers within a pair of headphones that are coupled to that computer system via a cable), but that the same audio controller will continue to be used. Therefore, it has become commonplace to assume that only one audio controller (e.g., only one of the internal audio controller 195 or the detachable audio device 500) will ever likely be used with a given computer system (and therefore, with a given operating system), and that users are unlikely ever to need a relatively quick and simple way to switch between audio controllers. Thus, despite it being possible for a user of the computer system 100 to choose to use the acoustic driver(s) 190 (and accordingly, choose to use the internal audio controller 195) or to choose to use the acoustic driver(s) 990 (and accordingly, choose to use the detachable audio device 500), the operating system 155 is unlikely to be configured to make it easy to do so. Furthermore, it is highly likely that a user of the computer system 100 will not have the technical background to appreciate that a choice between using the acoustic driver(s) 190 and the acoustic driver(s) 990 necessitates a choice between a combination of the internal audio controller 195 and the internal audio driver 149, and a combination of the detachable audio device 500 and the detachable audio driver 159.

Some operating systems (e.g., some variants of the Windows operating system offered by Microsoft Corporation of Redmond, Wash., USA) do provide some accommodation to a change in audio controllers in response to a user coupling an external audio controller to an interface bus of a computer system (e.g., USB, PCCard or ExpressCard). This subset of operating systems will respond to the coupling of such an external audio controller by causing the processing device of the computer system to perform a device discovery procedure to identify the newly coupled external audio controller, and then select the appropriate device driver software to enable use of that newly coupled external audio controller. In so doing, this subset of operating systems will deselect whatever device driver software that was previously in use to support whatever internal audio controller that may exist within that computer system. Such actions are taken based on the presumption that a user would not couple an external audio controller if the user did not intended to use it in place of whatever internal audio controller that may be present, and this subset of operating systems will not again select a device driver for whatever internal audio controller may be present until the user has uncoupled the external audio controller. Thus, this subset of operating systems does provide a means by which a user may select between an internal and an external audio controller, but the means for doing so requires the user to couple or uncouple the external audio controller whenever they wish to make such a selection. As will be immediately apparent to those skilled in the art of providing computer-related services to average computer users, many users of computer systems will not fully understand the need to couple and uncouple an external audio controller to make such a choice, and many others will not feel comfortable in doing so, even if they understand that it is necessary to do so in order to make such a selection.

A further difficulty exists where the external audio controller is a device that is meant to enable the use of acoustic drivers that may not be located in the vicinity of a computer system, such that a user may be in the vicinity of such distantly located acoustic drivers when they decide that they wish to use those distantly located acoustic drivers, and would have to come over to where the computer system is located to perform the act of coupling the external audio controller to the computer system in order to use those distantly located acoustic drivers. Thus, the need to physically couple or uncouple an external audio controller to or from a computer system may impose an undesired degree of inconvenience, as well as being cumbersome or confusing to users who are not technically skilled.

Figure 3A:
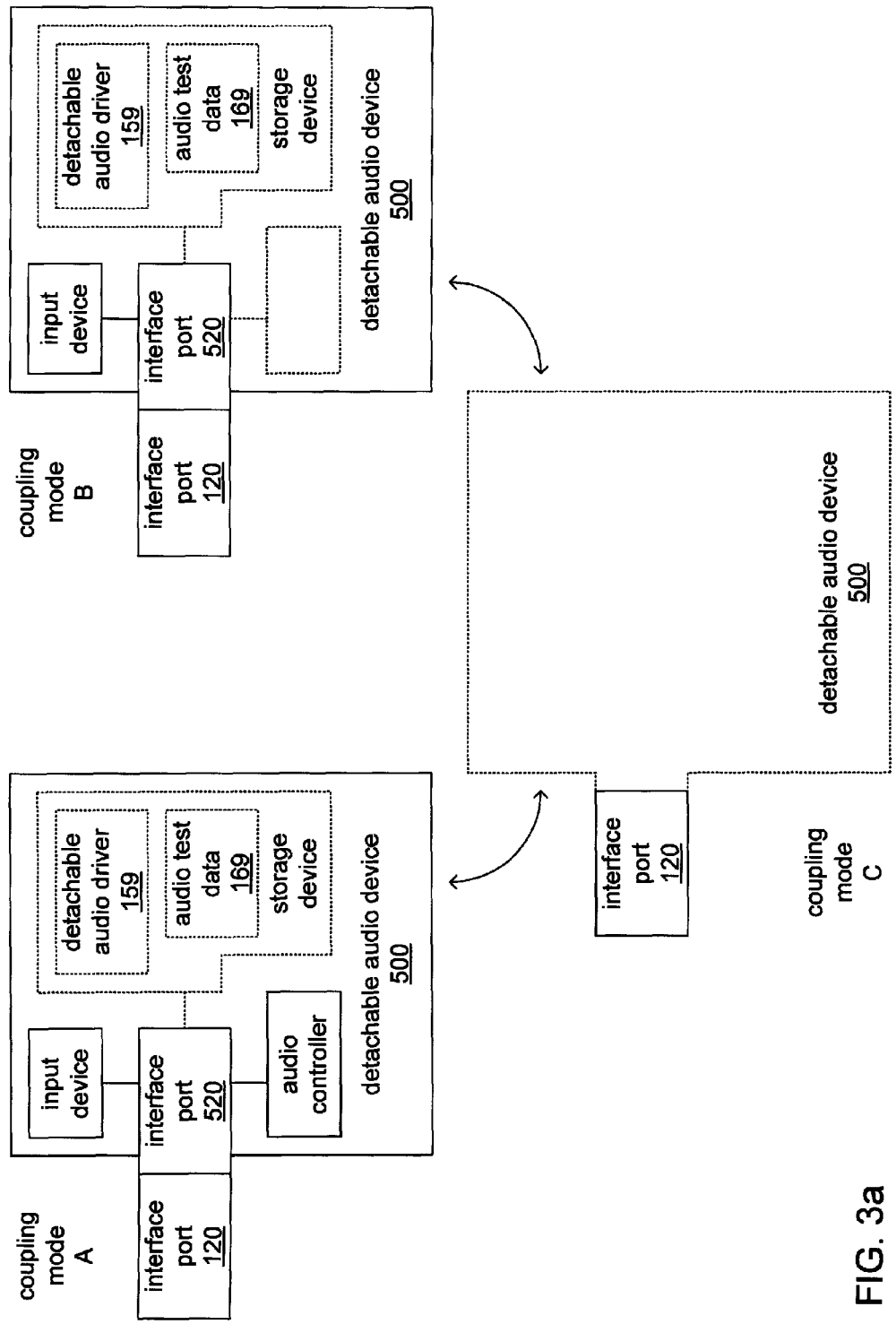
FIGS. 3a and 3b are block diagrams of possible approaches to enabling remotely controlled selection of driver software, an audio controller and corresponding acoustic driver(s).
Figure 3B:
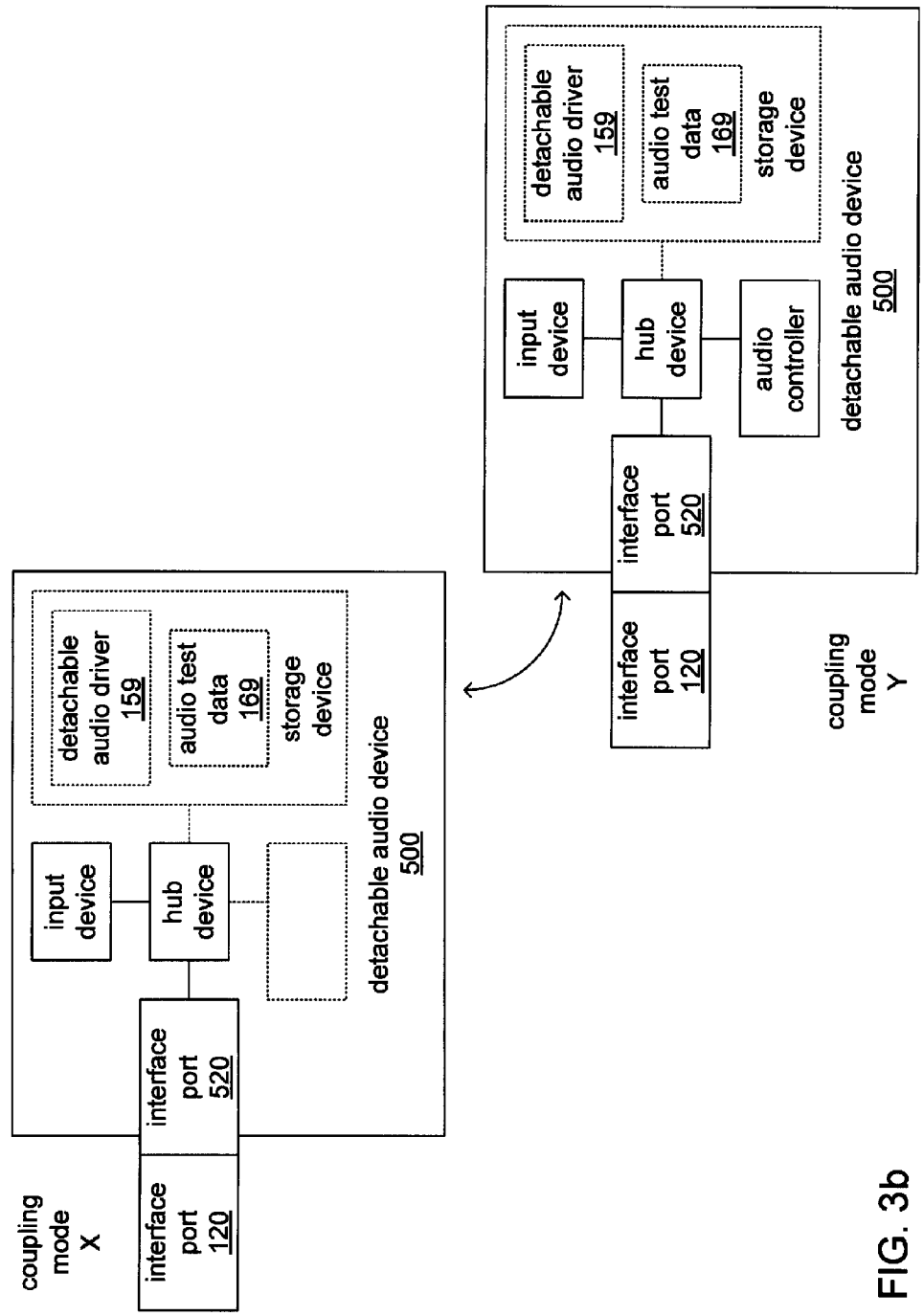

FIGS. 3a and 3b are block diagrams of two possible approaches by which the detachable audio device 500 may present itself to the computer system 100 to actually make use of limitations of the operating system 155 to enable remotely controllable selection between the internal audio controller 195 and the detachable audio device 500 by simulating the coupling or uncoupling of an external audio controller. More precisely, where the operating system 155 is one of the subset of operating systems that supports changing between the use of the internal audio controller 195 and an external audio controller based on whether that external audio controller is coupled to the computer system 100 via the interface port 120, or not, the detachable audio device 500 cooperates with the audio/visual device 900 to simulate a coupling or uncoupling of an external audio controller to or from the interface port 120 in response to user operation of the user input device 910 at a location remote from the computer system 100. As a result, a user is able to couple the detachable audio device 500 to the computer system 100 via the interface ports 120 and 520, and leave them coupled to each other. The audio/visual device 900, with its acoustic driver(s) 990, is then able to be positioned at some distance from the vicinity of the computer system 100 (perhaps, in another room), and a user is then able to operate the user input device 910 (which may be a manually-operable control carried on the casing 905 of the audio/visual device 900, or may be a manually-operable control carried on a physically separate portion of the audio/visual device 900, such as a remote control) to select whether audio played by the computer system 100 is to be played via the acoustic driver(s) 190 of the computer system 100 (as driven by the internal audio controller 195) or is to be played via the acoustic driver(s) 990 of the audio/visual device 900 (with the audio relayed to the audio/visual device 900 through the detachable audio device 500).

The mechanism by which the detachable audio device 500 presents itself to the computer system 100 is by the provision of the previously discussed device identity data 509 in response to the processing device 150 being caused by the interface driver 142 to perform a device discovery procedure in response to the detachable audio device 900 being coupled to the interface port 120. However, while most of the possible specifications for interface buses to which the interface port 120 may conform expect that identifying data presented by one device to another during device discovery will remain constant and unchanging, each of the two approaches depicted in FIGS. 3a and 3b rely on the device identity data 509 being dynamically alterable as part of the response to user operation of the user input device 910 to select between the internal audio controller 195 and the detachable audio device 500. As will be explained in greater detail, part of simulating the coupling or uncoupling of an external audio controller to or from the interface port 120 entails presenting different versions of the device identity data 509.

FIG. 3a depicts how the detachable audio device 500 presents itself to the computer system 100 in three different coupling modes that the detachable audio device 500 may adopt in implementing one approach to simulating the coupling or uncoupling of an external audio controller to or from the interface port 120. More precisely, with the interface port 520 of the detachable audio device 500 having been coupled by a user to the interface port 120 of the computer system 100, and remaining so coupled, the detachable audio device 500 changes from one coupling mode (A) in which the detachable audio device 500 presents itself as being coupled and including an audio device, to another coupling mode (B) in which the detachable audio device 500 presents itself as being coupled and not including an audio device. These changes between these two coupling modes (A and B) entail a transition through an intermediate coupling mode (C) in which the detachable audio device 500 simulates having been entirely uncoupled, even though the detachable audio device 500 is still coupled to the interface port 120.

With the detachable audio device 500 in the one coupling mode (A) in which it presents itself as being coupled to the interface port 120 and as including an external audio controller, the operating system 155 causes the processing device 150 to respond to this presentation of there being an external audio controller by selecting the detachable audio driver 159 to support the playing of audio instead of the internal audio driver 149, with the result that a playing of audio by the computer system 100 will entail the use of the detachable audio device 500, and thus, entail the use of the acoustic driver(s) 990 of the audio/visual device 900 in actually acoustically outputting that audio. With the detachable audio device 500 in the other coupling mode (B) in which it presents itself as being coupled to the interface port 120 and as not including an external audio controller, the operating system 155 causes the processing device 150 to respond to this presentation of there being no external audio controller by selecting the internal audio driver 149 to support the playing of audio instead of the detachable audio driver 159, with the result that a playing of audio by the computer system 100 will entail the use of the internal audio controller 195, and thus, entail the use of the acoustic driver(s) 190 in actually acoustically outputting that audio. This difference between these two coupling modes in how the detachable audio device 500 presents itself to the computer system 100 is depicted in FIG. 3a with an audio controller being depicted as part of what is presented to the computer system 100 in the one coupling mode (A) and with an empty dotted-line box indicating a lack of an audio controller being depicted as part of what is presented to the computer system 100 in the other coupling mode (B). With the detachable audio device 500 in the intermediate coupling mode (C) in which it simulates not being coupled to the interface port 120, at all, the operating system 155 causes the processing device 150 to respond to what appears to be the resulting lack of an external audio controller by selecting the internal audio driver 149 instead of the detachable audio driver 159, with the result that a playing of audio by the computer system 100 will entail the use of the internal audio controller 195, and thus, entail the use of the acoustic driver (s) 190 in actually acoustically outputting that audio (i.e., a result very much the same as with the other coupling mode (B)). The fact of the detachable audio device 500 acting essentially as if it is not present in this intermediate coupling mode (C) is depicted in FIG. 3a as an empty dotted-line box coupled to the interface port 120.

In transitioning from the one coupling mode (A) in which the detachable audio device 500 presents itself as being coupled to the interface port 120 and as including an external audio controller to the other coupling mode (B) in which it presents itself as being coupled to the interface port 120 and as not including an external audio controller, the detachable audio device 500 initially transitions to the intermediate coupling mode (C) in which it simulates being entirely uncoupled from the interface port 120. Where the characteristics of the interface ports 120 and 520 are meant to conform to a specification for a bus interface such as USB, PCCard or ExpressCard, where there are electrical conductors conveying power that are separate from those involved in conveying data, the detachable audio device 500 may continue to draw power via conductors employed to convey power while substantially disconnecting from conductors involved in conveying data (e.g., placing drivers in "tri-state" mode, operating transistors to disconnect pull-up or pull-down resistors, etc.) to carry out its simulation of being uncoupled from the interface port 120. Regardless of exactly how the detachable audio device 500 simulates being uncoupled, the interface controller 125 is caused to perceive the detachable audio device 500 as no longer being coupled, and responds by signaling the processing device 150 to that effect. In turn, the processing device 150 is caused, as a result of executing a sequence of instructions of at least the operating system 155 (and likely also of the interface driver 142), to select the internal audio driver 149 for use in supporting the playing of at least an audio portion of an audio/visual program, since the apparent uncoupling of the detachable audio device 500 has created the appearance of there no longer being an external audio controller available for use by the computer system 100.

Having made this initial transition to the intermediate coupling mode (C) in which it simulates being entirely uncoupled from the interface port 120, the detachable audio device 500 subsequently transitions to the other coupling mode (B) in which the detachable audio device 500 presents itself as being once again coupled to the interface port 120 and as not including an external audio controller. In essence, the detachable audio device 500 simulates being coupled again to the interface port 120. Where the detachable audio device 500 had simulated being uncoupled from the interface port 120 by disconnecting from conductors involved in conveying data, the detachable audio device 500 now connects to those conductors, again. Regardless of exactly how the detachable audio device 500 simulates being coupled, again, the interface controller 125 is caused to perceive the detachable audio device 500 as now being coupled, again, and responds by signaling the processing device 150 to that effect. In turn, the processing device 150 is caused, as a result of executing a sequence of instructions of at least the interface driver 142 (and likely also of the operating system 155), to operate the interface controller 125 to perform a device discovery procedure through the interface port 120 to determine what exact device has now been coupled to the interface port 120. In response to this device discovery procedure, the detachable audio device 500 provides the computer system 100 with a version of the device identity data 509 that identifies the detachable audio device 500 as a device that does not incorporate an external audio controller. In response to receiving this version of the device identity data 509, the processing device 150 is caused, as a result of executing a sequence of instructions of at least the operating system 155 (and likely also of the interface driver 142), to continue to select the internal audio driver 149 for use in supporting the playing of audio.

Transitioning back from the other coupling mode (B) in which the detachable audio device 500 presents itself as being coupled to the interface port 120 and as not including an external audio controller to the one coupling mode (A) in which it presents itself as being coupled to the interface port 120 and as including an external audio controller, the detachable audio device 500 performs very much the same steps, again. The detachable audio device 500 again initially transitions to the intermediate coupling mode (C) in which it simulates being entirely uncoupled from the interface port 120. Again, the interface controller 125 is caused to perceive the detachable audio device 500 as no longer being coupled, and responds by signaling the processing device 150 to that effect. In turn, the processing device 150 is caused, as a result of executing a sequence of instructions of at least the operating system 155 (and likely also of the interface driver 142), to continue to select the internal audio driver 149 for use in supporting the playing of at least an audio portion of an audio/visual program, since the apparent uncoupling of the detachable audio device 500 has created the appearance of there no longer being an external audio controller available for use by the computer system 100. The detachable audio device 500 subsequently transitions to the one coupling mode (A) in which the detachable audio device 500 presents itself as being once again coupled to the interface port 120 and as including an external audio controller. The interface controller 125 is caused to perceive the detachable audio device 500 as now being coupled, again, and responds by signaling the processing device 150 to that effect. In turn, again, the processing device 150 is caused, as a result of executing a sequence of instructions of at least the interface driver 142 (and likely also of the operating system 155), to operate the interface controller 125 to perform a device discovery procedure through the interface port 120 to determine what exact device has now been coupled to the interface port 120. In response to this device discovery procedure, the detachable audio device 500 provides the computer system 100 with a different version of the device identity data 509 that identifies the detachable audio device 500 as a device that does incorporate an external audio controller. In response to receiving this version of the device identity data 509, the processing device 150 is caused, as a result of executing a sequence of instructions of at least the operating system 155 (and likely also of the interface driver 142), to now select the detachable audio driver 159 for use in supporting the playing of audio, since there now again appears to be an external audio controller present.

In making these transitions, it may be deemed desirable for the detachable audio device 500 to remain in the intermediate coupling mode (C) before for a predetermined period of time as a delay before transitioning to the desired one or other of the coupling modes in which the detachable audio device 500 presents itself as being coupled and as either including or not including an external audio controller. Such a "slowing down" of the processes of making these transitions may be found to be necessary to allow the processing device 150 of the computer system 100 enough time to execute the sequences of instructions of the operating system 155 and of the interface driver 142, thus allowing the computer system 100 to complete taking action in response to the transitions to the intermediate coupling mode (C) before making the subsequent transitions from the intermediate coupling mode (C).

Also in making these transitions, the detachable audio device 500 may, at least while in the intermediate coupling mode (C), need to draw electric power from the power source 505 as a result of the computer system 100 ceasing to provide electric power through the interface port 120. It has been observed that some portable computer systems that normally provide electric power to interface ports (such as the interface port 120) will do so only as long as there is a device detected as being coupled to those interface ports, and will cease to provide that electric power during times when no device is detected as being so coupled. Thus, the act of simulating being entirely uncoupled from the interface port 120 in the intermediate coupling mode (C) may result in the processing device 150 being caused to operate the interface controller 125 to remove the provision of electric power from the interface port 120. Therefore, the detachable audio device 500 may temporarily rely on the power source 505 for the provision of electric power in situations where the computers system 100 is of the type that does cease to provide electric power on such occasions.

FIG. 3b depicts how the detachable audio device 500 presents itself to the computer system 100 in two coupling modes that the detachable audio device 500 may adopt in implementing another approach to simulating the coupling or uncoupling of an external audio controller to or from the interface port 120. More precisely, with the interface port 520 of the detachable audio device 500 having been coupled by a user to the interface port 120 of the computer system 100, and remaining so coupled, the detachable audio device 500 changes from one coupling mode (X) in which the detachable audio device 500 presents itself as being coupled and including an audio device, to another coupling mode (Y) in which the detachable audio device 500 presents itself as being coupled and not including an audio device. As depicted, these changes between these two coupling modes (X and Y) may not entail a transition through an intermediate coupling mode in which the detachable audio device 500 simulates having been entirely uncoupled. Instead, as depicted, these changes between these two coupling modes (X and Y) more simply entail a simulation of coupling or uncoupling only an external audio device.

With the detachable audio device 500 in the one coupling mode (X) in which it presents itself as being coupled to the interface port 120 and as including an external audio controller coupled to the interface port 120 through a hub device of the detachable audio device 500, the operating system 155 causes the processing device 150 to respond by selecting the detachable audio driver 159 to support the playing of audio instead of the internal audio driver 149. With the detachable audio device 500 in the other coupling mode (B) in which it presents itself as being coupled to the interface port 120 and as including the same hub device with the previously present external audio controller no longer present and coupled to the interface port 120 through the hub device, the operating system 155 causes the processing device 150 to respond by selecting the internal audio driver 149 to support the playing of audio instead of the detachable audio driver 159.

By presenting itself to the computer system 100 as having a hub device to which other devices (e.g., an audio controller) may or may not be coupled at any given time, the detachable audio device 500 is able to simulate only the coupling and uncoupling of an audio controller without having to simulate the coupling and uncoupling of the entirety of the detachable audio device 500. Thus, the approach depicted in FIG. 3b requires fewer coupling modes, making it considerably simpler than the approach depicted in FIG. 3a. However, this simpler approach depicted in FIG. 3b requires that the type of interface bus provided by the interface ports 120 and 520, and by their corresponding interface controllers 125 and 525, respectively, is able to support having a hub device that forms multiple interface buses from the one interface bus to thereby permit multiple devices to be coupled to the interface port 120 through that hub device. Further, at least the interface driver 142 must also support such use of a hub device, if not also the operating system 155.

Another advantage of the approach of FIG. 3b is that the simulation of the coupling and uncoupling of only an audio controller through a hub that remains coupled to the coupled to the interface port 120 throughout means that at no time is the computer system 100 presented with a simulation of there being no device coupled to the interface port 120, at all, and this entirely prevents possible occurrences of the computer system 100 ceasing to provide electric power to the detachable audio device 500 through the interface port 120. This, in turn, may remove the need for the detachable audio device 500 to incorporate the power source 505.

In transitioning from the one coupling mode (X) in which the detachable audio device 500 presents itself as being coupled to the interface port 120 and as including an external audio controller coupled to the interface port 120 through a hub device, and to the other coupling mode (Y) in which the detachable audio device 500 presents itself as still being coupled to the interface port 120 (i.e., not simulating an uncoupling from the interface port 120) and as not including an external audio controller coupled to the interface port 120, the detachable audio device 500 simply simulates a removal of the external audio controller. The interface controller 125 is caused to perceive the hub device as still being coupled, but with the external audio controller having been uncoupled from the hub device, and responds by signaling the processing device 150 to that effect. In turn, the processing device 150 is caused, as a result of executing a sequence of instructions of at least the operating system 155 (and likely also of the interface driver 142), to select the internal audio driver 149 for use in supporting the playing of at least an audio portion of an audio/visual program, since there now appears to no longer be an external audio controller available for use by the computer system 100.

Transitioning back from the other coupling mode (Y) in which the detachable audio device 500 presents itself as being coupled to the interface port 120 and as including a hub device to which no external audio controller is coupled, and to the one coupling mode (A) in which the detachable audio device 500 presents itself as being coupled to the interface port 120 and as including both the hub device and an external audio controller coupled to the interface port 120 through that hub device, the detachable audio device 500 simply simulates the coupling, once again, of an external audio device to the hub device. The interface controller 125 is caused to perceive having an external audio controller present, once again, and responds by signaling the processing device 150 to that effect. In turn, the processing device 150 is caused, as a result of executing a sequence of instructions of at least the interface driver 142 (and likely also of the operating system 155), to operate the interface controller 125 to perform a device discovery procedure through the interface port 120 and that hub device to determine what exact device has now been coupled to the interface port 120 through that hub device. In response to this device discovery procedure, the detachable audio device 500 provides the computer system 100 with a different version of the device identity data 509 that identifies the external audio controller as being an audio controller. In response to receiving this version of the device identity data 509, the processing device 150 is caused, as a result of executing a sequence of instructions of at least the operating system 155 (and likely also of the interface driver 142), to now select the detachable audio driver 159 for use in supporting the playing of audio, since there now again appears to be an external audio controller present.

In both of the approaches depicted in FIGS. 3a and 3b, the transitions between coupling modes are triggered by user operation of the user input device 910 in a manner that indicates that the user is selecting one or the other of the acoustic drivers 190 or 990 through which to have at least an audio portion of an audio/visual program played by the computer system 100. The audio/visual device 900 signals the detachable audio device 500 through the wireless link 700 formed between them concerning user operation of a manually-operable control of the audio/visual device 900 that indicates a user selection of one or the other acoustic drivers 190 or 990.

As previously discussed, and referring back to the depiction of a possible architecture of the detachable audio device in FIG. 2, the processing device 550 is caused, by retrieving and executing a sequence of instructions of the control routine 545 stored within the storage 540, to at least operate the interface controller 525 to receive audio provided to the detachable audio device 500 by the computer system 100 for being played, and to at least operate the wireless transceiver 570 to relay that audio to the audio/visual device 900 for being acoustically output by the acoustic driver(s) 990 as part of carrying out that playing of that received audio. However, the processing device 550 is also caused by the control routine 545 to operate the wireless transceiver 570 to receive signals from the audio/visual device 900 indicating user operation of the user input device 910 that indicates a user selection of one or the other the acoustic drivers 190 and 990 for playing audio, and the processing device 500 is further caused by the control routine 545 to operate the interface controller 525 to simulate a coupling or uncoupling of either an external audio controller or the entirety of the detachable audio device 500 to effectuate the selection of acoustic driver(s) made by the user.

Thus, where the approach depicted in FIG. 3a is employed, when a user operates the user input device 910 to select playing audio with the acoustic driver(s) 990, instead of with the acoustic driver(s) 190, the audio/visual device 900 signals the detachable audio device 500 through the wireless link 700 to that effect. The processing device 550 is caused by execution of the control routine 545 to operate the wireless transceiver 570 to monitor the wireless link 700 for such a signal. Upon receipt of the signal from the audio/visual device 900, the processing device 550 is further caused by the control routine 545 to operate the interface controller 525 to transition the detachable audio device 500 from the coupling mode (B) in which the detachable audio device 500 has presented itself to the computer system 100 as not including an external audio controller to the intermediate coupling mode (C) in which the detachable audio device 500 simulates having been uncoupled from the interface port 120. In other words, the processing device 550 is caused to operate the interface controller 525 to simulate this uncoupling. Subsequently, the processing device 550 is still further caused by the control routine to operate the interface controller 525 to transition the detachable audio device 500 from the intermediate coupling mode (C) to the coupling mode (A) in which the detachable audio device 500 presents itself to the computer system 100 as including an external audio controller. In other words, processing device 550 is caused to operate the interface controller 525 to simulate the detachable audio device 500 being coupled, once again, to the interface port 120, thus triggering the processing device 150 to perform a device discovery procedure, as has been previously described. In response to the processing device 150 performing the device discovery procedure, the processing device 550 is yet further caused by the control routine 545 to complete the transition to the coupling mode (A) by operating the interface controller 525 to provide the computer system 100 with a version of the device identity data 509 that indicates that the detachable audio device 500 includes an external audio controller. Receipt of this version of the device identity data 509 triggers the processing device 150 to select the detachable audio driver 159 for supporting the playing of at least an audio portion of an audio/visual program, as has been previously described.

Continuing with the approach depicted in FIG. 3a, the actions performed by the processing device 550 in response to receiving a signal from the audio/visual device 900 indicating that a user has now operated the user input device 910 to select playing audio with the acoustic driver(s) 190, instead of with the acoustic driver(s) 990, are quite similar. The processing device 550 is again caused to operate the interface controller 525 to first simulate an uncoupling of the detachable audio device 500 from the interface port 120, thus transitioning the detachable audio device 500 back to the intermediate coupling mode (C). The processing device 550 is then caused to operate the interface controller 525 to simulate the detachable audio device 500 being coupled, once again, to the interface port 120 to again trigger the performance of a device discovery procedure by the processing device 150. And, in response to the device discovery procedure again being performed, the processing device 550 completes the transitioning of the detachable audio device 500 to the coupling mode (A) by operating the interface controller 525 to provide the computer system 100 with a version of the device identity data that indicates that the detachable audio device 500 does not include an external audio controller, thus triggering the processing device 150 to select the internal audio driver 149.

Alternatively, where the approach depicted in FIG. 3b is employed, when a user operates the user input device 910 to select playing audio with the acoustic driver(s) 990, instead of with the acoustic driver(s) 190, the audio/visual device 900 signals the detachable audio device 500 through the wireless link 700 to that effect. The processing device 550 is caused by execution of the control routine 545 to operate the wireless transceiver 570 to monitor the wireless link 700 for such a signal. Upon receipt of the signal from the audio/visual device 900, the processing device 550 is further caused by the control routine 545 to operate the interface controller 525 to transition the detachable audio device 500 from the coupling mode (Y) in which the detachable audio device 500 has presented itself to the computer system 100 as including a hub device to which no external audio controller is coupled, to coupling mode (X) in which the detachable audio device presents itself to the computer system 100 as still including the hub device, but now with an external audio controller coupled to it (and thereby, coupling that audio controller to the interface port 120 through the hub device). In other words, the processing device 550 is caused to operate the interface controller 525 to simulate a coupling of an external audio controller to the hub device, thus triggering the processing device 150 to perform a device discovery procedure of what has been coupled to the interface port 120 through that hub device. In response to the processing device 150 performing the device discovery procedure, the processing device 550 is yet further caused by the control routine 545 to complete the transition to the coupling mode (X) by operating the interface controller 525 to provide the computer system 100 with a version of the device identity data 509 that identifies the external audio device that has been simulated as being coupled to the hub device as an external audio device, thus triggering the processing device 150 to select the detachable audio driver 159 for supporting the playing of at least an audio portion of an audio/visual program, as has been previously described.

Continuing with the approach depicted in FIG. 3b, in response to receiving a signal from the audio/visual device 900 indicating that a user has now operated the user input device 910 to select playing audio with the acoustic driver(s) 190, the processing device 550 is caused to operate the interface controller 525 to now simulate an uncoupling of the external audio controller from the hub device. This results in a simulated lack of an external audio controller coupled to the interface port 120 through the hub device, thus transitioning the detachable audio device 500 back to the coupling mode (Y). This triggers the processing device 150 to select the internal audio driver 149, since there now appears to no longer be an external audio controller present.

Regardless of which of the approaches depicted in FIG. 3a or 3b are used to trigger the change in selection of device drivers within the computer system 100 to effectuate a change ultimately in which acoustic driver(s) are used, the user input device 910 may, in some embodiments, be used to do more than simply allow a user to select acoustic drivers. Indeed, it may be that the user input device 910 (especially if implemented as part of a remote control that a user might easily carry about) enables a user to select audio/visual programs for playing (e.g., the user input device 910 may include manually-operable "previous track," "next track" or "random mode" buttons) and/or enables a user to control aspects of the playing of at least an audio portion of an audio/visual program (e.g., the user input device 910 may include manually-operable "transport" controls, such "reverse," "pause" or "fast-forward") regardless of whether audio is being played through the acoustic driver(s) 190 or 990. In other words, it may be deemed desirable to enable a user to control aspects of selection and/or playing of audio via the user input device 910, even if audio is being played via the acoustic driver(s) 190 of the computer system and the audio/visual device 900 is in no way involved in the actual playing of that audio.

Thus, as depicted in both of the approaches in FIGS. 3a and 3b, the detachable audio device 500 presents itself to the computer system 100 as including an input device, even when in coupling modes in which the detachable audio device 500 presents itself as not including an audio controller. By so doing, the processing device 150 is caused, by execution of a sequence of instructions of the operating system 155 and/or the interface driver 142 to receive input from a user via either of the user input devices 110 or 910, and this enables the detachable audio device 500 is able to signal the computer system 100 concerning signals that the detachable audio device 500 receives via the wireless link 700 that indicate user operation of the user input device 910. More precisely, the processing device 550 is caused by the control routine 545 to operate the interface controller 525 to provide indications of user operation of the user input device 910 to the computer system 100, with the computer system 100 accepting that is user input in addition to whatever user input is provided to the computer system 100 through the user input device 110.

It should be noted that some signals received by the detachable audio device 500 concerning user operation of the user input device 910 are not in any way relayed to the computer system 100 (e.g., signals indicating a user selection of acoustic driver, which the processing device 550 may take action in response to without also signaling the computer system 100 to the effect that such signals had been received), while other received signals indicating user operation of the user input device 910 are relayed to the computer system (e.g., signals indicating selection of audio to be played and/or controlling an aspect of playing audio). Alternatively and/or additionally, there may be signals indicating user operation of the user input device 910 that both result in the processing device 550 taking some form of action (e.g., causing a transition in coupling modes) and result in some form of signal concern that user input being relayed to the computer system 100 (e.g., a user command to commence play of audio). For example, there may be a presumption made that user operation of the user input device 910 to select and play at least an audio portion of an audio/visual program is to be taken to mean that the user wishes the acoustic driver(s) 990 to be used, while user operation of the user input device 110 to select and play that same audio is to be taken to mean that the user wishes the acoustic driver(s) 190 to be used. In such an example, user operation of the user input device 910 to cause the playing of audio would then result in the processing device 550 (as caused by control routine 545) check of the current coupling mode of the detachable audio device 500, changing the coupling mode if the current coupling mode is not one that would cause playing of audio to entail use of the acoustic driver(s) 990, and signaling the computer system 100 to commence playing audio. As will be explained later, the processing device 550 may be further caused to perform a test playing of audio to ensure that the detachable audio driver 159 has been successfully selected, the coupling of the interface ports 120 and 520 is in good order and/or other aspects of the needed cooperation between the computer system 100 and the detachable audio device 500 are in place for successful playing of audio by the computer system 100, through the detachable audio device 500 and using the acoustic driver(s) 990.

It should also be noted that, as has been depicted throughout FIGS. 1a, 1b and 2, and as has been discussed, the detachable audio device 500 is repeatedly presenting itself to the computer system 100 as being a device that includes various devices (or combinations of devices) that the detachable audio device 500 does not actually physically include, itself. Instead, the processing device 550 is caused by portions of the control routine 545 to operate the interface controller 525 to provide the computer system 100 with an emulation of the expected behavior of such devices, those portions being one or more of an audio device routine 559, a storage device routine 556, a hub device routine 555 and/or an input device routine 551.

By way of example, the detachable audio device 500 does not, itself, actually include an audio controller. Instead, the processing device 550 is caused, by executing a sequence of instructions of the audio device routine 559, to operate the interface controller 525 to emulate the behavior that would be expected to be encountered by the computer system 100 through the interface port 120 if there were an external audio device coupled to the computer system 100 via the interface port 120 (whether through a hub device, or not). This may entail emulating the existence of one or more control registers, the existence audio data buffers, the use of some form of audio data synchronization, etc. In truth, the real external audio controller is located within the casing 905 or other portion of the audio/visual device 900, where it is more efficient for it to be located in order to more efficiently drive the acoustic driver(s) 990. Thus, the audio device routine 559 causes the processing device 550 to operate the interface port 520 to receive audio data representing audio to be played, and to operate the wireless transceiver 570 to relay that audio data to the audio/visual device 900 for being played as by being acoustically output by the acoustic driver(s) 990 as driven by the audio controller of the audio/visual device 900. As has been previously discussed, differences in specifications to which the interface bus supported by the interface ports 120 and 520 versus specifications of the wireless link 700 supported by the transceiver 570 and its counterpart within the audio/visual device 900 (or perhaps other factors) may lead to it being deemed desirable for the processing device 550 to be caused to perform any of a variety of data format conversions and/or other processing operations on the audio data received from the computer system 100 before relaying it to the audio/visual device 900.

By way of another example, By way of example, the detachable audio device 500 does not, itself, actually include a user input device. Instead, the processing device 550 is caused, by executing a sequence of instructions of the input device routine 551, to operate the interface controller 525 to emulate the behavior that would be expected to be encountered by the computer system 100 through the interface port 120 if there were a user input device coupled to the computer system 100 via the interface port 120 (whether through a hub device, or not). As has already been explained, it is preferred that the detachable audio device 500 present itself to the computer system 100 as including a user input device so as to enable the processing device 550 to signal the computer system 100 (through the interface port 120) concerning user operation of the user input device 910. Such a presentation triggers the selection and use of driver software to provide support for the operating system 155 causing the processing device 150 to accept user input. It is preferred that the emulation of a user input device provided by the processing device 550 mimic the behavior of a widely-used user input device that might otherwise have likely been coupled to the interface port 120. Such mimicry in the emulation of a user input device would likely enable the selection and use of driver software for a user input device that would be highly likely to already be stored within the storage 140, and would perhaps be the very same input driver 141 already employed to support acceptance of user input from the user input device 110. While it might be tempting to regard the detachable audio device 500 as simply serving as one component of what might be regarded as a wireless user input device (with the user input device 910 being the other component), the processing device 550 is not caused by the input device routine 551 to simply signal the computer system 100 with indications of every user operation of the user input device 910. Instead, and has already been explained, the processing device 550 signals the computer system 100 concerning only some user operation of the user input device 910, and employs other user operation of the user input device 910 as signals for the detachable audio device 500 to perform functions such as transitioning between coupling modes (perhaps also accepting user input to directly configure one or more features of the detachable audio device 500).

By way of still another example, the detachable audio device 500 is not actually a combination of devices that includes a hub device through which the other devices are able to be coupled to the interface port 120. Instead, the processing device 550 is caused, by executing a sequence of instructions of the hub device routine 555, to operate the interface controller 525 to emulate the behavior that would be expected to be encountered by the computer system 100 through the interface port 120 if there were a hub device coupled to the interface port 120 of the computer system 100 through which other devices could then also be coupled to the interface port 120. As is depicted in FIGS. 3a and 3b, and has already been discussed, the presentation of the detachable audio device 500 as having a hub device occurs in the approach depicted in FIG. 3b, but not in the approach depicted in FIG. 3a. As has already been explained, some interface buses to which the interface port 120 may conform do support having devices coupled through a hub device, while other interface buses do not. Where a given interface port 120 conforms to an interface bus specification in which a hub device is supported, it may be deemed advantageous for the processing device 550 to be caused to present the detachable audio device 500 to the computer system 100 as having a hub device, because of the opportunity to avoid having to simulate the coupling and uncoupling of the entirety of the detachable audio device to and from the interface port 120 (as is done in the approach depicted in FIG. 3a) to trigger the selection of different audio controllers to change between using one or the other of the acoustic drivers 190 and 990.

As those skilled in the art of interface bus protocols that include discovery procedures will readily recognize, where a hub device is encountered along with one or more other devices coupled to the hub device, separate device discovery procedures are normally performed for the hub device and for each of the other devices that may be coupled to the hub device. Indeed, it is not uncommon for the first device discovery procedure to be performed on the hub device, itself, in response to it being coupled to the interface port of whatever computer system is to perform the device discovery procedure. For some interface buses, this first device discovery procedure performed on the hub device is the means by which the hub device is identified as a hub device such that the computer system to which the hub device has been coupled is made aware of the possible need to perform additional device discovery procedures to identify whatever other devices may be coupled to the computer system through the hub device. Thus, where the detachable audio device 500 is presented to the computer system 100 as including a hub device, the computer system 100 may perform multiple device discovery procedures though the interface port 120 in an effort to identify all devices that may be coupled to the interface port 120 through the hub device that the processing device 550 is being caused to emulate by the hub device routine 555. Thus, depending on characteristics of the interface bus to which the interface ports 120 and 520 have been made to conform, the processing device 550 may need to separately respond to each of multiple device discovery procedures by separately presenting different pieces of the device identity data 509, with each of those different pieces separately identifying a different one of a hub device, an audio controller, and whatever other devices as being included. In other words, the processing device 550 may need to mimic the behavior of a combination of devices to a degree that includes separate responses to separate device discovery procedures being carried out to identify each device.

Still another device that the processing device 550 may be caused to emulate (in this case, by a sequence of instructions of the storage device routine 556) is a storage device meant to be accessible to the computer system 100 through the interface port 120, and through which one or both of the detachable audio driver 159 and the audio test data 169 may be accessible to the computer system 100. It should be made clear that the incorporation of the storage 540 into the detachable audio device 500 so as to provide a location in which software may be stored for being retrieved and executed by the processing device 550 should not be confused with providing an emulation of a storage device coupled to the interface port 120. The storage 540 is a real storage device making up part of the structure of the detachable audio device 500, while the storage device presented to the computer system 100 may be either a physically separate storage device (not shown) or may be an entirely fictitious and non-existent storage device that exists only in an emulated or "virtual" sense. More precisely, it may be that the processing device 550 is caused by the storage device routine 556 to use a portion of the storage capacity of the storage 540 to provide this emulated storage device, and it may be that copies of the detachable audio driver 159 and/or the audio test data 169 are placed within this portion to make one or both accessible to the computer system 100. Such an emulated storage device may be presented to the computer system 100 as being present only to provide a mechanism by which the computer system 100 may be provided with copies of one or both of the detachable audio driver 159 and the audio test data 169 without entailing the use of separate storage media that would have to be accessed via the removable media device 160, and/or without entailing accessing a network and/or the Internet to download one or both of the detachable audio driver 159 and the audio test data 169 from a remotely located server.

In embodiments in which the audio test data 169 is provided (either through the guise of an emulated storage device, or by other means), the audio test data 169 may be employed, at least in situations in which one or the other of the acoustic drivers 190 or 990 is being selected, as an input for a test to confirm that a selection has been successfully and fully carried out. As has been described at length, simulations of couplings and uncouplings of devices are being performed in an effort to trigger certain desired behaviors by the processing device 150 of the computer system 100 to effect a selection of desired driver software, to in turn, effect a selection of a desired audio controller, to ultimately in turn, effect a selection of desired acoustic driver(s) for use in playing audio (i.e., at least an audio portion of an audio/visual program). As those familiar with computer architectures will readily recognize, it is possible for a processing device to become "saturated" with processing interrupts or coordinating the sharing of a bus or portion of memory with a coprocessor such that an indicator of an event, such as a coupling or uncoupling of a device, is entirely missed. Thus, it is possible that there could be occasions in which the processing device 150 is not caused to take action to select desired driver software in response to simulations of couplings or uncouplings performed by the detachable audio device 500 (i.e., by the processing device 550 under the control of the control routine 545).

Thus, the audio test data 169 may be made accessible to the processing device 150, and the processing device 150 may be caused by the detachable audio driver 159 to employ the audio test data 169 in a test of the ability to play audio through the desired one of the acoustic drivers 190 or 990. More precisely, upon a user having operated the user input device 910 in a manner indicating the desire to use the acoustic driver(s) 990, and following the simulation of whatever coupling or uncoupling (e.g., either of the approaches depicted in FIG. 3a or 3b) to trigger the selection of the detachable audio driver 159 by the processing device 150, the detachable audio driver 159 may then cause the processing device 150 to briefly play the audio test data and the processing device 550 may be caused by the control routine 545 to operate the interface controller 525 to monitor for receipt of the audio test data 169 as part of it being played to provide confirmation that the selection of the detachable audio driver 159 has been successfully carried out.

Such testing to confirm success of a selection of an acoustic driver may be useful where the detachable audio device 500 engages in simulations of couplings and uncouplings to not only effect a selection indicated by a user, but to also automatically return the selection of acoustic driver back to a predetermined default state and the meeting of predetermined circumstances. By way of example, use of the acoustic driver (s) 190 may be deemed to be the default selection to enable a user to more easily directly operate the computer system 100 to play audio at the vicinity of the computer system 100 through the acoustic driver(s) 190 without requiring the user to take the additional step of manually operating the user input device 110 in some way to select the acoustic driver(s) 190. When the user operates the user input device 910 to select the acoustic driver(s) 990 to play audio, the detachable audio device 500 engages in whatever simulations of couplings and/or uncouplings is required to effect the selection, and then the audio test data 169 is played to confirm that the selection of the detachable audio driver 159 (and correspondingly, the acoustic driver(s) 990) has been successfully carried out. When the user has either ceased playing audio for a predetermined period of time, or has taken some other step that indicates that the user has chosen to stop listening to audio (at least through the acoustic drivers 990), such as operating the user input device 910 to turn off the audio/visual device 900, then the detachable audio device 500 engages in whatever further simulations of couplings and/or uncouplings is required to again cause the internal audio driver 149 (and correspondingly, the acoustic driver(s) 190) to again be selected. The audio test data 169 is then again played to confirm that at least the selection of the acoustic driver(s) 990 has been undone, i.e., the detachable audio device 500 should no longer receive the audio test data 169 through the interface port 120 when the audio test data 169 is played.

Alternatively and/or additionally, the audio test data 169 may be employed at other times not immediately following a selection of acoustic driver being carried out as a mechanism to test the continued readiness of the computer system 100 and/or the detachable audio device 500 to play audio. More precisely, the audio test data 169 may be caused by the detachable audio driver 159 to be played after a long interval of time during which there has been no playing of audio (e.g., after the passage of a predetermined number of hours or days) to ensure that nothing has occurred during that interval of time that might in some way prevent playing of audio from being successfully carried out.

The audio test data 169 may include a series of tones (preferably outside the range of human hearing) and/or may include a series of bit patterns. It is preferred that the audio test data 169 be of compact size such that the period of time required to play the audio test data 169 is relatively brief so as to not unduly delay the playing of whatever audio that a user actually desires to hear.

Other implementations are within the scope of the following claims and other claims to which the applicant may be entitled.

The invention claimed is:

1. A detachable audio device comprising:
a first connector to be coupled to a second connector of a computer system;
an interface controller coupled to the first connector;
a first processing device; and
a first storage storing a sequence of instructions that when executed by the first processing device causes the first processing device to:
operate the interface controller to simulate coupling of a first audio controller to the computer system through the first and second connectors at a time when the first and second connectors are coupled to trigger a first performance of a device discovery procedure through the second connector by a second processing device of the computer system; and
operate the interface controller to respond to the first performance of the device discovery procedure through the second connector by the second processing device by providing the computer system a first device identity data through the first and second connectors, wherein the first device identity data presents the detachable audio device as comprising the first audio controller to enable acoustic output of audio by the computer system through the detachable audio device to trigger an operating system executed by the second processing device to employ a first audio driver in acoustically outputting audio to cause the computer system to employ the detachable audio device in acoustically outputting audio.

2. The detachable audio device of claim 1, further comprising a wireless transceiver, and wherein the first processing device is further caused to:
operate the interface controller to simulate the presence of the first audio controller within the detachable audio device to receive data representing audio to be acoustically output from the computer system through the first and second connectors; and
operate the wireless transceiver to convey the audio to an audio/visual device for being acoustically output by an acoustic transducer of the audio/visual device.

3. The detachable audio device of claim 2, wherein the first device identity data presents the detachable audio device as comprising a user input device.

4. The detachable audio device of claim 3, wherein the first processing device is further caused to:
operate the wireless transceiver to receive indications of a user operating a user input device of the audio/visual device to select to between causing the audio to be acoustically output through an acoustic driver of the audio/visual device and causing the audio to be acoustically output through an acoustic driver coupled to a second audio controller accessible to the second processing device; and
operate the interface controller to simulate one of coupling the first audio controller to the computer system and uncoupling the first audio controller from the computer system.

5. The detachable audio device of claim 3, wherein the first processing device is further caused to:
operate the wireless transceiver to receive indications of a user operating a user input device of the audio/visual device to cause the audio to be acoustically output; and
operate the interface controller to simulate a user operating the user input device to convey a command to the computer system to cause the computer system to provide the data representing the audio through the first and second connectors.

6. The detachable audio device of claim 5, wherein:
the audio comprises an audio test data; and
the first processing device is further caused to operate the interface controller to await receipt of the audio test data to confirm that the first audio driver is being employed in acoustically outputting audio by the second processing device.

7. The detachable audio device of claim 1, wherein:
the first processing device being caused to operate the interface controller to simulate coupling of the first audio controller to the computer system comprises the processing device being caused to operate the interface controller to simulate coupling of the entirety of the detachable audio device to the computer system through the first and second connectors; and
the first processing device is further caused to simulate uncoupling of the first audio controller from the computer system by simulating uncoupling of the entirety of the detachable audio device from the computer system.

8. The detachable audio device of claim 7, further comprising a power source to store electric power, wherein:
the first processing device employs electric power received from the computer system at times when coupling of the entirety of the detachable audio device to the computer is simulated and the computer system provides electric power to the detachable audio device through the first and second connectors; and
the first processing device employs electric power stored in the power source at times when uncoupling of the entirety of the detachable audio device from the computer is simulated and the computer system ceases to provide electric power to the detachable audio device.

9. The detachable audio device of claim 7, wherein the first processing device is further caused to further simulate uncoupling of the first audio controller from the computer system by:
simulating coupling of the entirety of the detachable audio device to the computer system through the first and second connectors to trigger a second performance of the device discovery procedure through the second connector by the second processing device; and
operating the interface controller to respond to the second performance of the device discovery procedure through the second connector by the second processing device by providing the computer system a second device identity data through the first and second connectors, wherein the second device identity data presents the detachable audio device as not comprising the first audio controller.

10. The detachable audio device of claim 1, wherein:
the first device identity data presents the detachable audio device as comprising a hub through which the first audio controller is coupled to the second connector;
the first processing device being caused to operate the interface controller to simulate coupling of the first audio controller to the computer system comprises the processing device being caused to operate the interface controller to simulate the coupling of the first audio controller to the computer system through the hub; and
the first processing device is further caused to simulate uncoupling of the first audio controller from the computer system by simulating uncoupling of the first audio controller from the hub.

11. A method comprising:
simulating coupling of a first audio controller to a computer system through a first connector of a detachable audio device and a second connector of the computer system at a time when the first and second connectors are coupled to trigger a first performance of a device discovery procedure through the second connector by a processing device of the computer system; and
responding to the first performance of the device discovery procedure through the second connector by providing the computer system a first device identity data through the first and second connectors, wherein the first device identity data presents the detachable audio device as comprising the first audio controller to enable acoustic output of audio by the computer system through the detachable audio device to trigger an operating system executed by the processing device to employ a first audio driver in acoustically outputting audio to cause the computer system to employ the detachable audio device in acoustically outputting audio.

12. The method of claim 11, further comprising:
simulating the presence of the first audio controller within the detachable audio device to receive data representing audio to be acoustically output from the computer system through the first and second connectors; and
wirelessly transmitting the audio to an audio/visual device for being acoustically output by an acoustic transducer of the audio/visual device.

13. The method of claim 12, wherein the first device identity data presents the detachable audio device as comprising a user input device.

14. The method of claim 13, further comprising:
receiving indications of a user operating a user input device of the audio/visual device to select to between causing the audio to be acoustically output through an acoustic driver of the audio/visual device and causing the audio to be acoustically output through an acoustic driver coupled to a second audio controller accessible to the processing device; and simulating one of coupling the first audio controller to the computer system and uncoupling the first audio controller from the computer system.

15. The method of claim 13, further comprising:

receiving indications of a user operating a user input device of the audio/visual device to cause the audio to be acoustically output; and simulating a user operating the user input device to convey a command to the computer system through the first and second connectors to cause the computer system to provide the data representing the audio through the first and second connectors.

16. The method of claim 15, wherein:

the audio comprises an audio test data; and the method further comprises awaiting receipt of the audio test data to confirm that the first audio driver is being employed in acoustically outputting audio by the processing device.

17. The method of claim 14, wherein:

simulating coupling of the first audio controller to the computer system comprises simulating coupling of the entirety of the detachable audio device to the computer system through the first and second connectors; and simulating uncoupling of the first audio controller from the computer system comprises simulating uncoupling of the entirety of the detachable audio device from the computer system.

18. The method of claim 17, wherein simulating uncoupling of the first audio controller from the computer system further comprises:

simulating coupling of the entirety of the detachable audio device to the computer system through the first and second connectors to trigger a second performance of the device discovery procedure through the second connector by the processing device; and responding to the second performance of the device discovery procedure through the second connector by the processing device by providing the computer system a second device identity data through the first and second connectors, wherein the second device identity data presents the detachable audio device as not comprising the first audio controller.

19. The method of claim 11, wherein:

the first device identity data presents the detachable audio device as comprising a hub through which the first audio controller is coupled to the second connector;

simulating coupling of the first audio controller to the computer system comprises simulating the coupling of the first audio controller to the computer system through the hub; and simulating uncoupling of the first audio controller from the computer system by simulating uncoupling of the first audio controller from the hub.

* * * * *